June 11, 1946.  C. SPRINGHORN  2,401,981
SELF-ACTING FRICTION CLUTCH
Filed Aug. 17, 1944
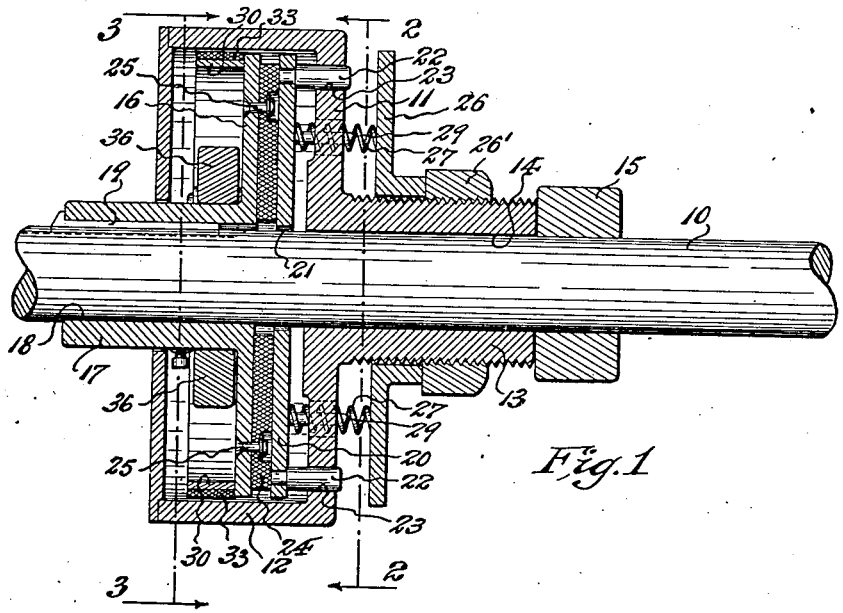
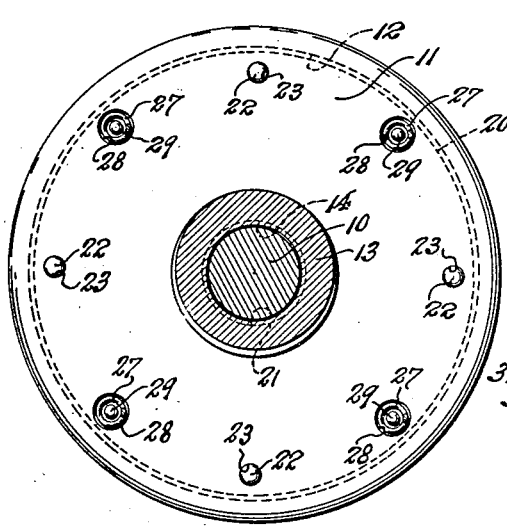
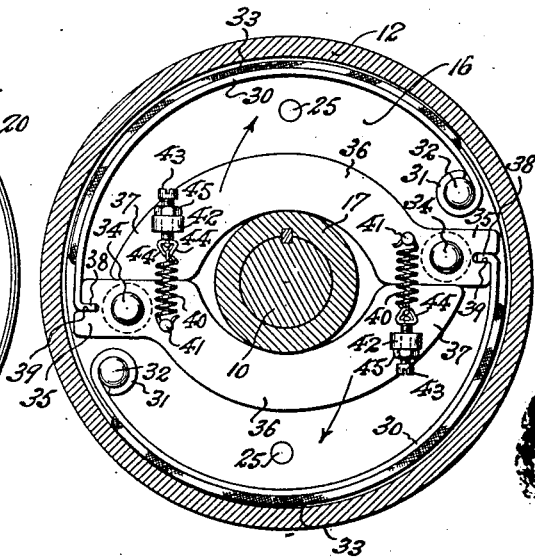
INVENTOR.
Charles Springhorn,
BY
George D. Richards,
Attorney Patented June 11, 1946

2,401,981

UNITED STATES PATENT OFFICE 2,401,981

SELF-ACTING FRICTION CLUTCH

Charles Springhorn, Orange, N. J., assignor to Metal Textile Corporation, West Orange, N. J., a corporation of Delaware Application August 17, 1944, Serial No. 549,845

6 Claims. (Cl. 192—105)

This invention relates to improvements in power transmission clutches; and the invention has reference, more particularly, to a novel self-acting friction clutch mechanism of the gradual load pick up type.

The invention has for an object to provide a novel self-acting friction clutch mechanism having primary slip clutch means for gradually applying power transmission to load until full speed movement of load is attained, and automatically acting secondary clutch means operative to take over power transmission to load when full speed movement of load is attained; all whereby transmission of power to load is gradually applied and accelerated until load inertia is entirely overcome and said load is moved at full speed.

The invention has for a further object to provide a novel compound clutch mechanism having a driving member and a driven member, a primary slip clutch means between said driving and driven members comprising constantly engaged driving and driven friction discs, and a secondary clutch means comprising expandible clutch means carried by the driven member to engage and disengage the driving member, and centrifugally controlled means also carried by said driven member for actuating said expandible clutch means.

Other objects of this invention, not at this time more particularly enumerated, will be understood from the following detailed description of the same.

An illustrative embodiment of the invention is shown in the accompanying drawing, in which:

Fig. 1 is a longitudinal sectional view of the self-acting friction clutch according to this invention; Fig. 2 is a transverse sectional view of the same, taken on line 2—2 in Fig. 1; and Fig. 3 is another transverse sectional view thereof, taken on line 3—3 in Fig. 1.

Similar characters of reference are employed in the above described views, to indicate corresponding parts.

In the drawing, the reference character 10 indicates a clutch actuated shaft by which power is transmitted to load. Mounted on said shaft 10, for free rotation thereon, is the driving member of the clutch mechanism. Said driving member comprises a hollow driving drum having a side wall 11 and a circumferential or annular wall 12. Extending exteriorly from said side wall 11 is a hub member 13, through the bore 14 of which extends said shaft 10. A collar 15 or other suitable means affixed to the shaft so as to abut the end of said hub member 13, serves to stop the driving drum against longitudinal displacement along said shaft.

Affixed to the shaft 10, to turn therewith, is the driven member of the clutch mechanism. Said driven member comprises a driven disc 16 adapted to be entered in the interior of the driving drum. Extending exteriorly from said driven disc 16 is a hub member 17, through the bore 18 of which extends said shaft 10. Said hub member 17 is affixed to the shaft 10 in any suitable manner, preferably by means of a key 19, whereby said driven disc 16 rotates with said shaft 10.

Arranged within the driving drum interior in opposition to the driven disc 16 of the driven member of the clutch mechanism, and intermediate said driven disc 16 and the side wall 11 of said driving drum, is a driving disc 20. Said driving disc 20 is provided with a central opening 21 through which the shaft freely extends.

The driving disc 20 is so related to the driving drum as to turn therewith and thus to be rotated thereby, but also in such manner as to be capable of axial movement toward the driven disc 16 of the driven member of the clutch mechanism. To this end, means is provided to effect a slide coupling connection between said driving disc 20 and the side wall 11 of the driving drum. Said slide coupling connection, in one illustrative form thereof, comprises a plurality of coupler studs or pins 22 which are affixed to the driving disc 20 to project rearwardly therefrom and through slideway openings 23 with which the side wall 11 of the driving drum is provided.

At least one of the discs 16 or 20 is provided with a facing body or disc 24 of suitable friction material suitably affixed thereto in opposition to the operative face of the other disc. As shown, this facing body or disc 24 is affixed to the operative face of the driven disc 16 by means of rivets 25 or other suitable fastening means.

Means is provided for exerting a constant tensional thrust of the driving disc 20 toward and in operative clutching engagement with the driven disc 16. For this purpose a thrust plate 26 is mounted upon the hub member 13 of the driving member of the clutch in spaced opposition to the exterior face of said side wall 11 of the latter. Mounted between said thrust plate 26 and said driven disc 16 are compression springs 27 which, being purchased for thrust by said thrust plate 26, function to urge the driving disc 20 into constant frictionally clutched engagement with the driven disc 16. Said side wall 11 of the driving drum is provided with openings 28 to permit free extension of said springs 27 therethrough; and, preferably, said driven disc 16 is provided with spring retaining studs 29 extending therefrom into the interiors of the springs, whereby to retain the springs against lateral displacement. It is desirable that means be provided for regulating or adjusting the effective tensional thrust of the springs 28. To this end the thrust plate 26 is so mounted on the hub member 13 of the driving drum as to be axially movable thereon toward and from the engaged friction discs 16 and 20, and said hub member 13 is externally screw-threaded, whereby to mount thereon an adjusting nut 26', operative to bear against the thrust plate 26, and adjustable to dispose the latter in desired spring tension determining position.

The driving and driven friction discs 20 and 16 constitute the primary constantly engaged slip clutch means operative between the driving and driven members of the clutch mechanism.

The secondary clutch means comprises movable or expandible clutch elements carried by the driven disc 16 for releasable clutched engagement with annular wall 12 of the driving member or drum of the clutch mechanism. Said movable or expandible clutch elements, in an illustrative form thereof, comprise a pair of arcuate clutch shoes 30, each having pivoting eyes 31 at one end journaled on a fulcrum stud 32 affixed to and projecting from the back or outer face of said driven disc 16. Each clutch shoe 30 is provided on its outer face with a friction band or lining 33. Said clutch shoes 30 are opposed to the annular wall 12 of the driving member or drum so as to be swingably or expandibly movable into and out of clutched engagement with said driving member or drum wall 12. Also pivoted upon fulcrum studs 34 affixed to and projecting from the back or outer face of said driven disc 16 are clutch shoe actuating levers adapted to respond to centrifugal force induced by rotation of said driven disc 16 whereby, under predetermined accelerated rotative speed of the latter to move said clutch shoes into clutched engagement with the driving member or drum wall 12. Each said lever is formed to provide an outer arm 35 and an inner arm 36, the latter being preferably of curved or semi-circular form to extend over and somewhat around the hub member 17 of the driven disc 16, and is also suitably enlarged toward its extremity whereby to provide a weighty or weighted free end portion 37. Suitable means is provided for operatively coupling respective outer arms 35 of the levers with the free end of a clutch shoe to be operated thereby. An illustrative form of such coupling connection as shown comprises an angular coupling tongue 38 with which the free end of each clutch shoe 30 is provided, which tongue engages in a coupling notch 39 which indents the extremity of the outer arm 35 of the cooperating actuating lever. In the illustrative clutch shoe-operating lever arrangement as shown, each clutch shoe is capable of resilient expansion or flexure as well as swinging movement about its fulcrum stud 32 under an operative thrust imparted thereto by its operating lever, whereby the external friction material faced side thereof is conformably and strongly engaged with the opposed surface of the annular wall 12 of the driving member or drum for clutched engagement with the latter. It will be observed that the clutch shoe-operating sets are arranged in diametrically opposed relation one to the other. When the operating lever arms 36 occupy normal initial in-swung positions, the clutch shoes will be withdrawn from clutched engagement with the driving member or drum wall (as shown in Fig. 3). To yieldably hold the operating lever arms 36 in normal in-swung positions, suitable pull spring means is provided. In an illustrative arrangement of such pull spring means as shown, the same comprises pull-spring members 40 extending between the opposed lever arms 36 from an anchor stud 41 affixed to the inner portion of one said lever arm 36 to an adjustable anchoring means affixed to the outer portion of the opposed lever arm 36. Said adjustable anchoring means comprises an anchor post 42 through which an adjusting screw 43 is threaded, said adjusting screw having a swivel coupling connection 44 with which the end of the spring member 40 to be coupled thereto is connected. Said adjusting screw 43 is provided with a lock or jam nut 45 for fixing the same in a given desired spring adjusting position. Said spring members 40 may be adjusted to offer predetermined initial resistance to operative movements of the clutch shoe operating levers under influence of centrifugal force, whereby to predetermine the rotative speed of the clutch disc 16 desired to be attained before the secondary clutch mechanism operates to take over transmission of power to load.

In operation, power is applied to the driving member or drum of the clutch mechanism in any suitable manner. For example, the driving member or drum may be directly driven by a belt of similar means (not shown) from a suitable power source. As the driving member or drum rotates, accompanying rotation is transmitted therefrom to the driving disc 20 of the constantly engaged primary slip clutch means of the clutch mechanism, whereby motion is imparted to the driven disc 16 and through the latter to shaft 10 for transmission of power to load. In overcoming inertia of the load, the driving disc 20 is free to slip relative to the driven disc 16, consequently the shaft 10 will be initially rotated at slow or low speed, which speed gradually accelerates, however, with diminishing slip between the driving and driven discs 20 and 16, as load inertia is overcome, and until the speed of the driven disc 16 is synchronized to that of the driving disc 20, and the shaft 10 is rotated at maximum high speed. The weighted lever arms 35—36 of the secondary clutch mechanism are subjected to the influence of centrifugal force induced by the increasing rotative speed of the driven disc 16, so that, by the time or shortly prior to the time the driven disc 16 attains speed synchronous to the driving drum and the driving disc 20 actuated thereby, said lever arms 35—36 will be turned about their fulcrum studs 34, by the induced centrifugal force, so as to move the clutch shoes 30 into clutched engagement with the annular wall 12 of the driving member or drum, whereupon said secondary clutch means functions to take over direct transmission of power to load, at maximum speed, from the driving member to the driven member of the clutch and the shaft 10 driven thereby. The moment of operation of the centrifugally controlled secondary clutch mechanism relative to a given rotative speed transmitted to the shaft 10 by the primary slip clutch means, may be selectively predetermined by suitably adjusting the tension of the pull-spring members 40 whereby the lever arms 35—36 are yieldably held in and returned to initial clutch shoe releasing position.

Having now described my invention, I claim:

1. A self-acting clutch mechanism, comprising a hollow driving drum having at least one side wall and an annular wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, means for tensionally thrusting said driving disc into operative engagement with said driven disc, movable clutch means carried by said driven disc, and centrifugally controlled means also carried by said driven disc for moving said movable clutch means into direct clutched engagement with the annular wall of said drum when the speed of said driven disc, as driven by said driving disc, attains approximate synchronism with that of said driving drum.

2. A self-acting clutch mechanism, comprising a hollow driving drum having at least one side wall and an annular wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, means for tensionally thrusting said driving disc into operative engagement with said driven disc, movable clutch means carried by said driven disc, centrifugally controlled means also carried by said driven disc for moving said movable clutch means into direct clutched engagement with the annular wall of said drum when the speed of said driven disc, as driven by said driving disc, attains approximate synchronism with that of said driving drum, and spring means for yieldably retaining said centrifugally controlled means in normal initial movable clutch means releasing position.

3. A self-acting clutch mechanism, comprising a hollow driving drum having at least one side wall and an annular wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, means for tensionally thrusting said driving disc into operative engagement with said driven disc, movable clutch means carried by said driven disc, centrifugally controlled means also carried by said driven disc for moving said movable clutch means into direct clutched engagement with the annular wall of said drum when the speed of said driven disc, as driven by said driving disc, attains approximate synchronism with that of said driving drum, spring means for yieldably retaining said centrifugally controlled means in normal initial movable clutch means releasing position, and means for adjusting the tension of said last mentioned spring means.

4. A self-acting clutch mechanism, comprising a hollow driving drum having at least one side wall, an annular wall, and a hub member externally projecting from said side wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, a thrust plate mounted on the drum hub, spring means interposed between said thrust plate and said driving disc for tensionally thrusting the latter into operative engagement with the driven disc, means for adjusting said thrust plate on said drum hub whereby to tensionally adjust said spring means, said drum side wall having means to permit extension of said spring means therethrough, movable clutch means carried by said driven disc, and centrifugally controlled means also carried by said driven disc for moving said movable clutch means into direct clutched engagement with the annular wall of said drum when the speed of said driven disc, as driven by said driving disc, attains approximate synchronism with that of said driving drum.

5. A self-acting clutch mechanism, comprising a hollow driving drum having at least one side wall, an annular wall, and a hub member externally projecting from said side wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, a thrust plate adjustably mounted on the drum hub, spring means interposed between said thrust plate and said driving disc for tensionally thrusting the latter into operative engagement with the driven disc, said drum side wall having means to permit extension of said spring means therethrough, movable clutch means carried by said driven disc, centrifugally controlled means also carried by said driven disc for moving said movable clutch means into direct clutched engagement with the annular wall of said drum when the speed of said driven disc, as driven by said driving disc, attains approximate synchronism with that of said driving drum, and spring means for yieldably retaining said centrifugally controlled means in normal initial movable clutch means releasing position.

6. A self-acting clutch mechanism, comprising a hollow driving drum having at least one side wall, an annular wall, and a hub member externally projecting from said side wall, a driven friction disc rotatable within said drum having means to affix the same to a shaft to be driven by the clutch mechanism, a driving friction disc within said drum in opposed constant frictional slip engagement with said driven disc, means to couple said driving disc with a side wall of said drum whereby to be driven by the latter and yet subject to axial movement toward the driven disc, a thrust plate adjustably mounted on the drum hub, spring means interposed between said thrust plate and said driving disc for tensionally thrusting the latter into operative engagement with the driven disc, said drum side wall having means to permit extension of said spring means therethrough, movable clutch means carried by said driven disc, centrifugally controlled means also carried by said driven disc for moving said movable clutch means into direct clutched engagement with the annular wall of said drum when the speed of said driven disc, as driven by said driving disc, attains approximate synchronism with that of said driving drum, spring means for yieldably retaining said centrifugally controlled means in normal initial movable clutch means releasing position, and means for adjusting the tension of said last mentioned spring means.

CHARLES SPRINGHORN.